(12) United States Patent
Woo

(10) Patent No.: US 9,420,923 B2
(45) Date of Patent: Aug. 23, 2016

(54) CHARGER SYSTEM FOR AN AUTOMATIC CLEANER

(75) Inventor: Tae-Young Woo, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 560 days.

(21) Appl. No.: 13/808,667

(22) PCT Filed: Jul. 16, 2010

(86) PCT No.: PCT/KR2010/004667
§ 371 (c)(1),
(2), (4) Date: Mar. 11, 2013

(87) PCT Pub. No.: WO2012/005399
PCT Pub. Date: Jan. 12, 2012

(65) Prior Publication Data
US 2013/0162194 A1 Jun. 27, 2013

(30) Foreign Application Priority Data

Jul. 6, 2010 (KR) .................. 10-2010-0065083
Jul. 6, 2010 (KR) .................. 10-2010-0065093

(51) Int. Cl.
*H02J 7/00* (2006.01)
*A47L 1/03* (2006.01)
*H02J 7/02* (2016.01)

(52) U.S. Cl.
CPC .............. *A47L 1/03* (2013.01); *H02J 7/0052* (2013.01); *H02J 7/025* (2013.01); *A47L 2201/00* (2013.01); *A47L 2201/022* (2013.01); *A47L 2201/04* (2013.01)

(58) Field of Classification Search
CPC .. H02J 7/025; H02J 7/0052; A47L 2201/022; A47L 1/03; A47L 2201/00; A47L 2201/04

USPC .................................... 320/101, 108
See application file for complete search history.

(56) References Cited

U.S. PATENT DOCUMENTS 5,869,910 A * 2/1999 Colens ..................... 307/104
7,031,805 B2 * 4/2006 Lee et al. ................. 700/245
(Continued)

FOREIGN PATENT DOCUMENTS

CN     1530781 A    9/2004
CN   101461684 A    6/2009
(Continued)

OTHER PUBLICATIONS

Machince Translation of JP05-042062, 7 pages.*
(Continued)

*Primary Examiner* — Nathaniel Pelton
(74) *Attorney, Agent, or Firm* — Ked & Associates, LLP

(57) ABSTRACT

Provided is a charging system of an automatic cleaner. The charging system includes an automatic cleaner performing cleaning while being moved in a state the automatic cleaner is attached on a target surface inclined with respect to the ground, the automatic cleaner comprising at least one battery and a charger configured to charge the at least one battery in a state where the at least one battery are physically spaced from the automatic cleaner. Here, the automatic cleaner includes first and second moving parts moved together with each other along the target surface, a moving unit disposed on at least one of the first and second moving parts, and a cleaning member for cleaning the target surface. Also, the automatic cleaner receives a charging-related signal to charge the battery using the signal.

12 Claims, 14 Drawing Sheets

(56) References Cited

U.S. PATENT DOCUMENTS

| | | | |
|---|---|---|---|
| 8,127,390 B2* | 3/2012 | Kim | 15/50.1 |
| 2004/0178767 A1* | 9/2004 | Jeon et al. | 320/114 |
| 2009/0106925 A1 | 4/2009 | Cheyne | |
| 2010/0156346 A1* | 6/2010 | Takada | B60L 11/182 320/108 |
| 2011/0074342 A1* | 3/2011 | MacLaughlin | 320/108 |
| 2011/0187317 A1* | 8/2011 | Mitake | B60L 5/005 320/108 |

FOREIGN PATENT DOCUMENTS

| | | | |
|---|---|---|---|
| CN | 101626873 A | | 1/2010 |
| JP | 05-042062 | * | 2/1993 |
| JP | 05-042062 A | | 2/1993 |
| JP | 2001-155944 A | | 6/2001 |
| JP | 2002345706 A | | 12/2002 |
| JP | 2003-111285 A | | 4/2003 |
| JP | 2005-304546 A | | 11/2005 |
| KR | 20-0222170 Y1 | | 5/2001 |
| KR | 20-0322362 Y1 | | 8/2003 |
| KR | 10-2006-0122513 A | | 11/2006 |
| KR | 10-2009-0054805 A | | 6/2009 |
| WO | WO2009118914 | * | 10/2009 |

OTHER PUBLICATIONS

Korean Office Action dated Aug. 5, 2014, issued in Application No. 201080068401.0.
International Search Report dated Aug. 10, 2011 issued in Application No. PCT/KR2010/004667.
Korean Office Action dated May 15, 2012 issued in Application No. 10-2010-0065093.
Korean Notice of Allowance dated Jul. 25, 2012 issued in Application No. 10-2010-0065083.
Korean Office Action dated Nov. 29, 2012 issued in Application No. 10-2010-0065093.
Chinese Office Action dated Mar. 12, 2015 issued in Application No. 201080068401.0.

* cited by examiner

CHARGER SYSTEM FOR AN AUTOMATIC CLEANER

CROSS-REFERENCE TO RELATED PATAENT APPLICATIONS

This application is a U.S. National Stage Application under 35 U.S.C. §371 of PCT Application No. PCT/KR2010/004667, filed Jul. 16, 2010, which claims priority to Korean Application Nos. 10-2010-0065083 and 10-2010-0065093, both filed Jul. 6, 2010.

TECHNICAL FIELD

The present invention relates to a charging system of an automatic cleaner.

BACKGROUND ART

In general, automatic cleaners clean the floor of houses or buildings while traveling the floor. A driving force for moving such an automatic cleaner may be generated by a driving motor. Here, since the floor is generally flat, the automatic cleaner may easily travel along the floor using the driving motor.

However, when a surface to be cleaned is inclined, but is not flat, that is, the automatic cleaner cleans a surface inclined upward in a traveling direction, the automatic cleaner may be limited in traveling.

Specifically, when a surface to be cleaned is a window of a building, the automatic cleaner may be very limited in use. Thus, windows should be manually cleaned by a user.

Furthermore, the number of high buildings is being significantly increased in recent years Due to the dangerousness of the cleaning of windows, it is very difficult to directly clean the windows by a resident of a high building. Thus, specialist companies that clean windows appear.

However, there is no automatic cleaner for automatically cleaning surfaces to be cleaned which are vertically or inclinedly disposed with respect to the ground such as windows.

Even though specialist cleaning companies clean windows, the workers should clean the windows while moving along the windows using a rope fixed to the roof of the building. Thus, there is a limitation that a large number of persons and appliances are required.

Moreover, when an area to be cleaned is large, portions that a worker does not approach may exist. In addition, the dangerousness with respect to safety accidents of workers may be increased.

DISCLOSURE OF THE INVENTION

Technical Problem

The present invention provides a charging system of an automatic cleaner which may charge a battery of the automatic cleaner at a position spaced from a charger.

The present invention also provides a charging system of an automatic cleaner which may charge a battery of the automatic cleaner using energy obtained from solar light.

Technical Solution

In an aspect of the present invention, a charging system includes: an automatic cleaner performing cleaning while being moved in a state the automatic cleaner is attached on a target surface inclined with respect to the ground, the automatic cleaner including at least one battery; and a charger configured to charge the at least one battery in a state where the at least one battery are physically spaced from the automatic cleaner, wherein the automatic cleaner includes: first and second moving parts moved together with each other along the target surface; a moving unit disposed on at least one of the first and second moving parts; and a cleaning member for cleaning the target surface, wherein the automatic cleaner receives a charging-related signal to charge the battery using the signal.

Advantageous Effects

According to the embodiments of the present invention, since the plurality of moving parts may be moved in a state where the moving parts are attached to the target surface, the inclined target surface may be cleaned.

Also, when the plurality of moving parts are disposed with the target object therebetween, both side surfaces of the target object may be cleaned.

Also, since the battery of the cleaner may be charged without contacting the charger, charging convenience may be improved.

Also, since the battery is charged using energy generated by the solar cell, the number of charging of the battery may be reduced.

MODE FOR CARRYING OUT THE INVENTION

Hereinafter, exemplary embodiments will be described with reference to the accompanying drawings.

In the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, assembled or joined to the second component.

Figure 1:
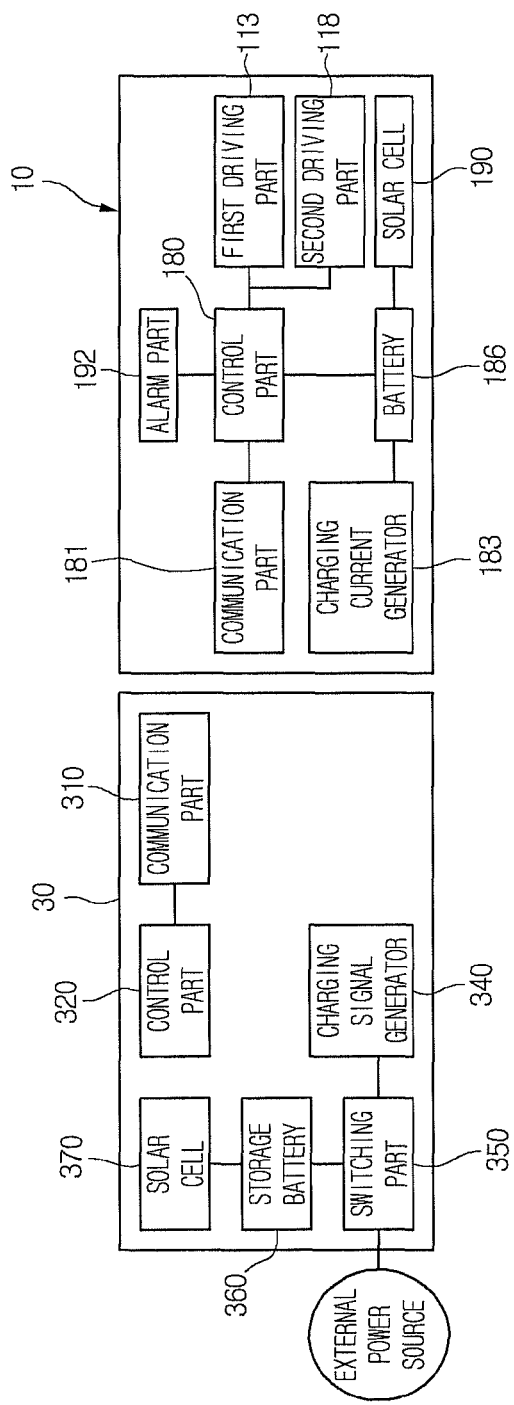
FIG. 1 is a block diagram illustrating a charging system of an automatic cleaner according to a first embodiment.
Figure 2:
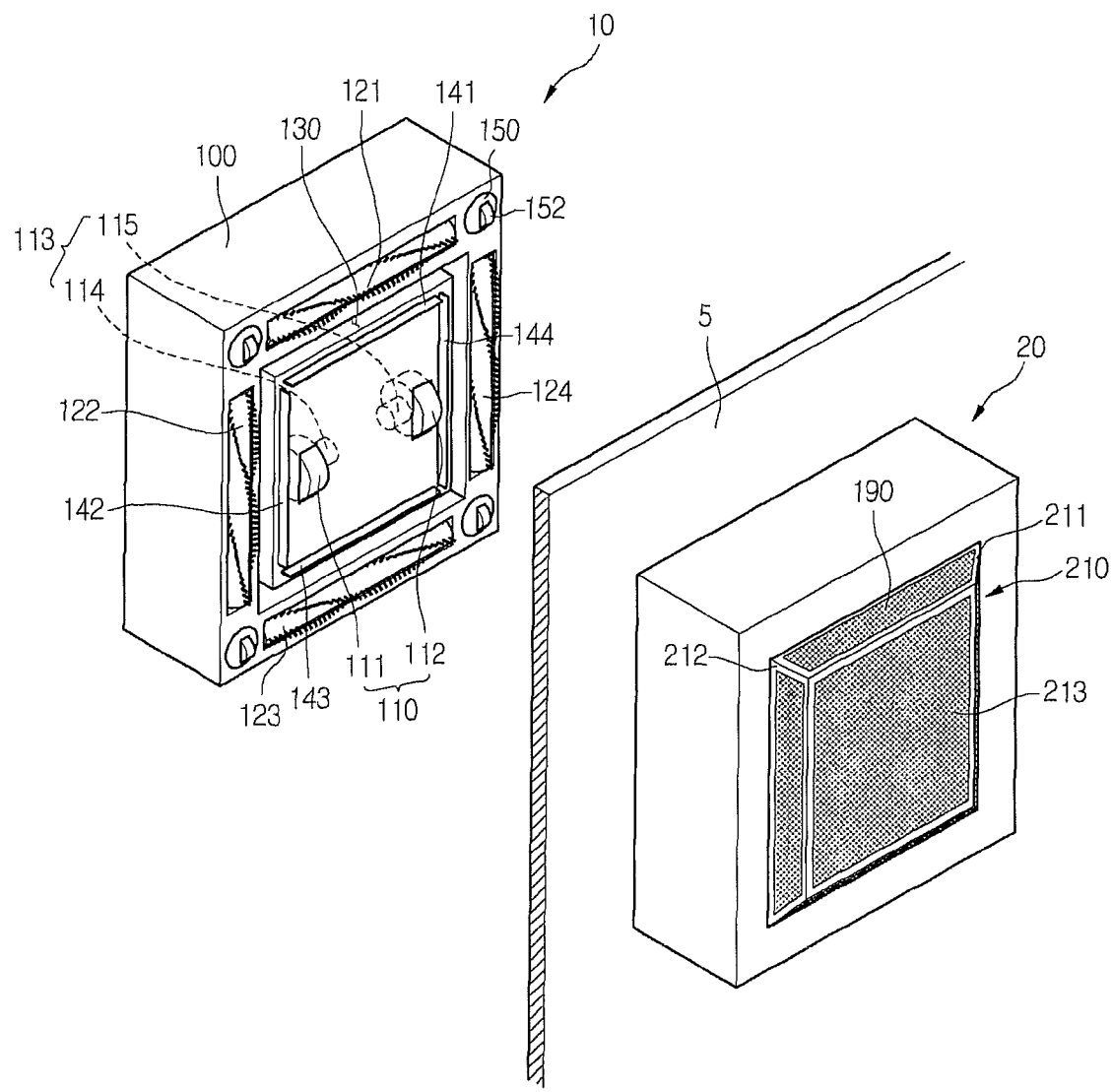
FIG. 2 is a perspective view of the automatic cleaner according to the first embodiment.
Figure 3:
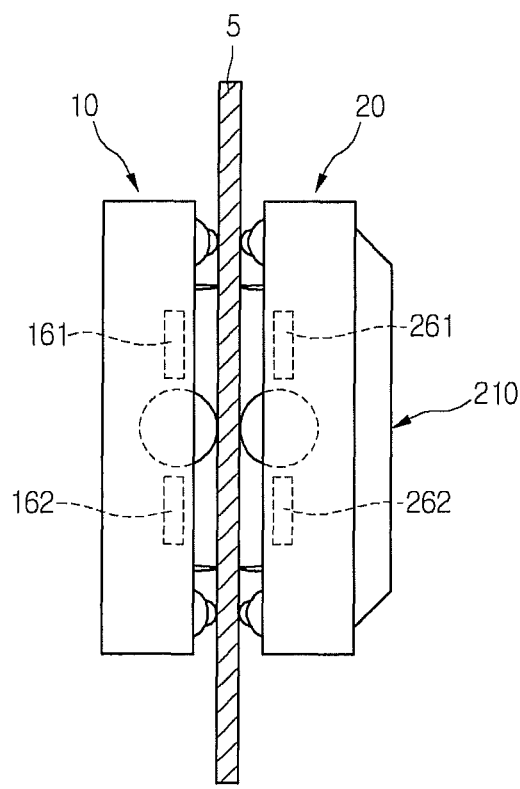
FIG. 3 is a view illustrating a state in which the automatic cleaner is attached to a surface to be cleaned according to the first embodiment.

FIG. 1 is a block diagram illustrating a charging system of an automatic cleaner according to a first embodiment. FIG. 2 is a perspective view of the automatic cleaner according to the first embodiment. FIG. 3 is a view illustrating a state in which the automatic cleaner is attached to a surface to be cleaned according to the first embodiment. For example, FIG. 3 illustrates a structure in which a solar cell module is installed on a second moving part (it is assumed to be in an indoor space).

Referring to FIGS. 1 to 3, a charging system according to the current embodiment includes an automatic cleaner 10 and 20 performing cleaning while being moved by oneself and a charger 30 for charging a battery disposed in the automatic cleaner 10 and 20.

First, a structure of the automatic cleaner 10 and 20 according to the current embodiment will be described below.

The automatic cleaner 10 and 20 includes a first moving part 10 and a second moving part 20. When the second moving part contacts the other surface of an object 5 to be cleaned (hereinafter, referred to as a target object) in a state where the first moving part 10 contacts one surface of the target object 5, the first and second moving parts 10 and 20 may be fixed in position by an attractive force. Here, the target object 5 may be inclined (including: vertical) with respect to the ground. It may be understood that the ground is a surface corresponding to the floor of a building or any place.

The first moving part 10 includes a main body 100 defining an outer appearance thereof. The main body 100 includes a main wheel 110 for movement of the main body 100, a first driving part 113 for rotating the main wheel 110, first and second cleaning members for cleaning the target object 5, an inlet port through which foreign substances on the target object 5 are introduced, an auxiliary wheel 152 for helping the movement of the main body 100, one or more first magnetic members 161 and 162, and a second driving part 118 for driving the first cleaning member.

Since the second moving part 20 has the fundamentally same structure as that of the first moving part 10, the configuration of the first moving part 10 may be equally applied to the second moving part 20. However, in the second moving part 20, a motor for rotating the main wheel may be removed. Thus, detailed description of the second moving part 20 will be omitted.

The second moving part 20 includes one or more magnetic members 261 and 262 interacting with the first magnetic members 161 and 162.

One of the first magnetic members 161 and 162 and the second magnetic members 261 and 262 may be a permanent magnet or an electromagnet, and the other one may be a metal. Alternatively, each of the first magnetic members 161 and 162 and the second magnetic members 261 and 262 may be a permanent magnet or an electromagnet.

Here, the magnetic members 161, 162, 261, and 262 may be disposed inside or outside the moving parts 10 and 20. Alternatively, a portion of each of the magnetic members 161, 162, 261, and 262 may be exposed to the outside of the moving parts 10 and 20 or protrude to the moving parts 10 and 20.

An attractive (magnetic) force may act between the first moving part 10 and the second moving part 20 by the magnetic members 161, 162, 261, and 262. Thus, each of the moving parts 10 and 20 may be maintained in a state where the moving parts 10 and 20 are attached to the target object 5. That is, it may prevent the moving parts 10 and 20 from dropping or sliding downward in a state where the moving parts 10 and 20 contact the inclined target object 5. The attractive force between the first magnetic members 161 and the second magnetic members 261 and 262 should have an intensity enough to prevent each of the moving parts 10 and 20 from dropping down.

In this specification, the magnetic members 161, 162, 261, and 262 may be referred to as an attachment maintaining unit for maintaining the attached state of each of the moving part on the target object.

The main wheel 110 includes a first main wheel 111 and a second main wheel 112 spaced from the first main wheel 111. The first driving part 113 includes a first motor 114 for rotating the first main wheel 111 and a second motor 115 for rotating the second main wheel 112.

The motors 114 and 115 may be independently operated and forwardly or backwardly rotated (bidirectionally rotated). Thus, the first and second main wheels 111 and 112 may be rotated at the same RPM (revolution per minute).

Thus, the first moving part 10 may be moved in forward and backward directions, as well as, be rotated on the target object. That is, when the first moving part 10 is moved, change of the direction may be possible. Here, if the first driving part 113 for rotating the main wheel is not provided on the second moving part 20, the second moving part 20 may be moved together with the first moving part 10 by the attractive force therebetween.

In this specification, the main wheel and the first driving part may be referred to as a moving unit for moving the moving part.

The first cleaning member may contact the target object 5. The first cleaning member includes a plurality of cleaning elements 121, 122, 123, and 124. The plurality of cleaning elements 121, 122, 123, and 124 include first to fourth cleaning elements. The first cleaning member may be disposed on a lower portion (a portion facing the target object) of each of the moving parts 10 and 20. Also, the first cleaning member may be disposed adjacent to a lower end of each of the moving part.

The first cleaning element 121 is disposed parallel to the third cleaning element 123, and the second cleaning element 122 is disposed parallel to the fourth cleaning element 124. Also, the first and third cleaning elements 121 and 123 are perpendicular to the second and fourth cleaning elements 122 and 124.

The cleaning elements 121, 122, 123, and 124 may be independently operated by the second driving part 118. For example, the cleaning elements 121, 122, 123, and 124 may be independently rotated. Here, each of the cleaning elements 121, 122, 123, and 124 may be vertically rotated with respect to a target surface of the target object 5. That is, a rotation axis of each of the cleaning elements 121, 122, 123, and 124 is parallel to the target surface.

Also, each of the cleaning elements 121, 122, 123, and 124 is rotated so that foreign substances are moved inward from the outside of each of the moving parts 10 and 20.

The second driving part 118 includes a plurality of motors. The number of motors may be equal to the number of cleaning elements 121, 122, 123, and 124 constituting the first cleaning member. Thus, the whole cleaning elements 121, 122, 123, and 124 or a portion of the cleaning elements 121, 122, 123, and 124 may be operated, and the cleaning elements 121, 122, 123, and 124 may be rotated at RPMs different from each other.

Alternatively, the second driving part 118 may include a single motor. A power generated by the single motor may be transmitted into the plurality of cleaning elements 121, 122, 123, and 124 by a power transmission. Here, operation information (control information) of the first and second moving parts 10 and 20 may be transmitted into the second moving part 20. Thus, the second driving part of the second moving part 20 may be operated with the same pattern as that of the second driving part 118 of the first moving part 10.

The inlet port 130 is spaced from the first cleaning member and disposed inward from the first cleaning member. That is, a distance from a center of each of the moving parts 10 and 20 to the inlet port 130 is less than that from the center of each of the moving parts 10 and 20 to the first cleaning member.

Foreign substances on the target object may be introduced into the inlet port 130. Here, each of the moving parts 10 and 20 may include a suction motor 188 for generating a suction force and a dust box (not shown) for storing introduced dusts.

The second cleaning member is spaced from the inlet port 130 and disposed inward from the inlet port 130. That is, the first cleaning member, the inlet port 130, and the second cleaning member are successively disposed from the outside of each of the moving parts 10 and 20 toward the inside.

Also, the second cleaning member may contact the target object 5. The second cleaning member includes a plurality of cleaning elements 141, 142, 143, and 144. The plurality of cleaning elements 141, 142, 143, and 144 include first to fourth cleaning elements.

The first cleaning element 141 is disposed parallel to the third cleaning element 143, and the second cleaning element 142 is disposed parallel to the fourth cleaning element 144. Also, the first and third cleaning elements 141 and 143 are perpendicular to the second and fourth cleaning elements 142 and 144.

Each of the cleaning elements 141, 142, 143, and 144 may be formed of, for example, rubber. When each of the moving parts 10 and 20 are moved, each of the cleaning elements 141, 142, 143, and 144 slide on the target object to clean the target object in a state where the cleaning elements 141, 142, 143, and 144 contact the target object.

At least one caster 150 rotated with respect to a rotation axis perpendicular to a bottom surface of each of the moving parts 10 and 20 is disposed on a lower portion of each of the moving parts 10 and 20. The auxiliary wheel 152 is disposed on the caster 150.

One of the first and second moving parts 10 and 20 may be disposed in an indoor space, and the other one may be disposed in an outdoor space. Thus, since the moving part disposed in the indoor space is variable, an input part for inputting an operation command (starting command, operation pattern, etc) may be disposed on each of the moving parts 10 and 20.

The first moving part 10 further includes a control part 180, a communication part 181, a charging current generator 183, a battery 186, a solar cell module 210, and an alarm part 192. Although not shown, the second moving part 20 further includes a control part 180, a communication part 181, a charging current generator 183, a battery 186, and an alarm part 192.

Since the communication part 181 is disposed on each of the moving parts, a signal inputted into one moving part may be transmitted into the other moving part through the communication part 181.

The solar cell module 210 may be separated from the first moving part 10 and disposed in the second moving part 20. Alternatively, the solar cell module 210 may be disposed in each of the moving parts 10 and 20.

The control part 180 generates various commands for operating the first moving part 10. Here, operation method information with respect to the second driving part 118 of the first moving part 10 is transmitted into the second moving part 20 through the communication part 181. The second driving part of the second moving part 20 may be operated by the same method as described above.

Also, the control part 180 determines a battery level to determine whether charging of the battery 186 is needed.

The solar cell module 210 is connected to the battery 186. Thus, the battery 186 may be charged by energy generated in the solar cell module 210.

The solar cell module 210 may be separably disposed on each of the moving parts 10 and 20. Here, the solar cell module 210 may be electrically connected to the battery 186 in a state where the solar cell module 210 is mounted on any moving part. The reason in which a solar cell module 210 is separable from each of the moving parts 10 and 20 is because it is advantageous that the solar cell module 210 is installed in the outdoor moving part.

The solar cell module 210 includes an installation part 211 installed on each of the moving parts 10 and 20 and a solar cell 190 installed on the installation part 211.

The installation part 211 may have a plurality of inclined surfaces 212 and a connection surface connecting the plurality of inclined surfaces to each other to increase an area into which solar light is irradiated. Also, the solar cell 190 is installed on the plurality of inclined surfaces 212 and the connection surface 213.

That is, the solar cell module 210 includes a plurality of solar cells 190 inclined in directions different from each other.

Although not shown, the installation part 210 may include a coupling part (e.g., a hook) coupled to each of the moving parts 10 and 20 and a connector electrically connected to each of the moving parts 10 and 20.

Also, the solar cell module 210 may further include a DC/DC converter (not shown) for booting a voltage generated in the solar cell 190 to a stable voltage.

The charger 30 includes a charging signal generator (or that may be referred to as a charging signal transmission part) 340 for transmitting a signal with respect to the charging so that current is generated in the charging current generator 183, a communication part 310 communicating with the automatic cleaner10 and 20, a control part 320 for controlling an operation of the charger 30, a solar cell 370, a battery 360 for storing electrical energy generated in the solar cell 370, and a switching part 350 selecting one of the battery 360 and an external commercial power source to connect the selected battery or commercial power source to the charging signal generator 340.

The charger 30 may be disposed in the indoor or outdoor space as necessary. In the charger 30 is disposed in the outdoor space, energy generated from the solar cell 370 may be stored in the battery 360.

Also, a charged amount of the storage battery 360 is above a predetermined level, power is supplied from the storage battery 360 to the charging signal generator 340. When the charged amount of the storage battery 360 is below a predetermined level, power is supplied from the external commercial power source to the charging signal generator 340.

The charging signal generator 340 and the charging current generator 183 transmit or receive a signal in a state where the charging signal generator 340 and the charging current generator 183 are spaced from each other to charge the battery 186.

Figure 4:
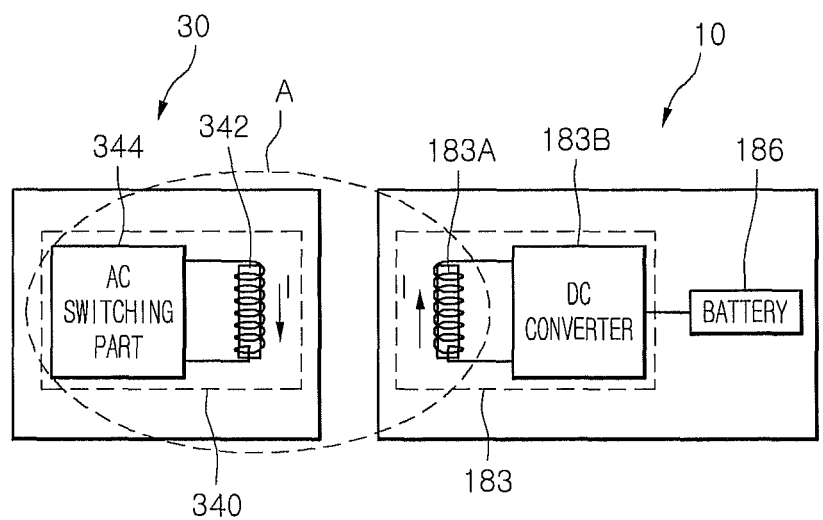
FIG. 4 is a view illustrating a state in which a battery of the automatic cleaner is charged by a charger according to the first embodiment.

FIG. 4 is a view illustrating a state in which a battery of the automatic cleaner is charged by a charger according to the first embodiment.

Referring to FIGS. 1 and 4, the charging signal generator 340 includes a first coil part 342 generating a magnetic field by applying predetermined current and voltage and an AC switching part 344 for applying the predetermined current and voltage to the first coil part 342.

The charging current generator 183 includes a second coil part 183A generating current according to the magnetic field generated in the first coil part 342 and a DC converter 183B for converting the AC current generated in the second coil part 183A into DC current.

In detail, since a plurality of coils are wound around the first coil part 342, when a predetermined current flows into the first coil part 342, a magnetic field is formed in a direction perpendicular to that of a flow of the current according to the Ampere's Law.

The magnetic field is formed within a predetermined area A. In a state where the second coil part 183A is disposed within the predetermined area A, current flows into the second coil part 183A by the magnetic field. Here, the flow direction of the current flowing into the second coil part 183A is opposite to that of the current flowing into the first coil part 342.

Thus, when current flows into the second coil part 183A, the current is supplied into the battery 186 via the DC converter 183B to charge the battery 186.

As described above, the current flows into the automatic cleaner 10 and 20 using the magnetic field generated in the charger 30 as a medium. Thus, the battery 186 disposed in each of the moving parts 10 and 20 may be charged without physically contacting the cleaner 10 and 20 with the charger 30.

Figure 5:
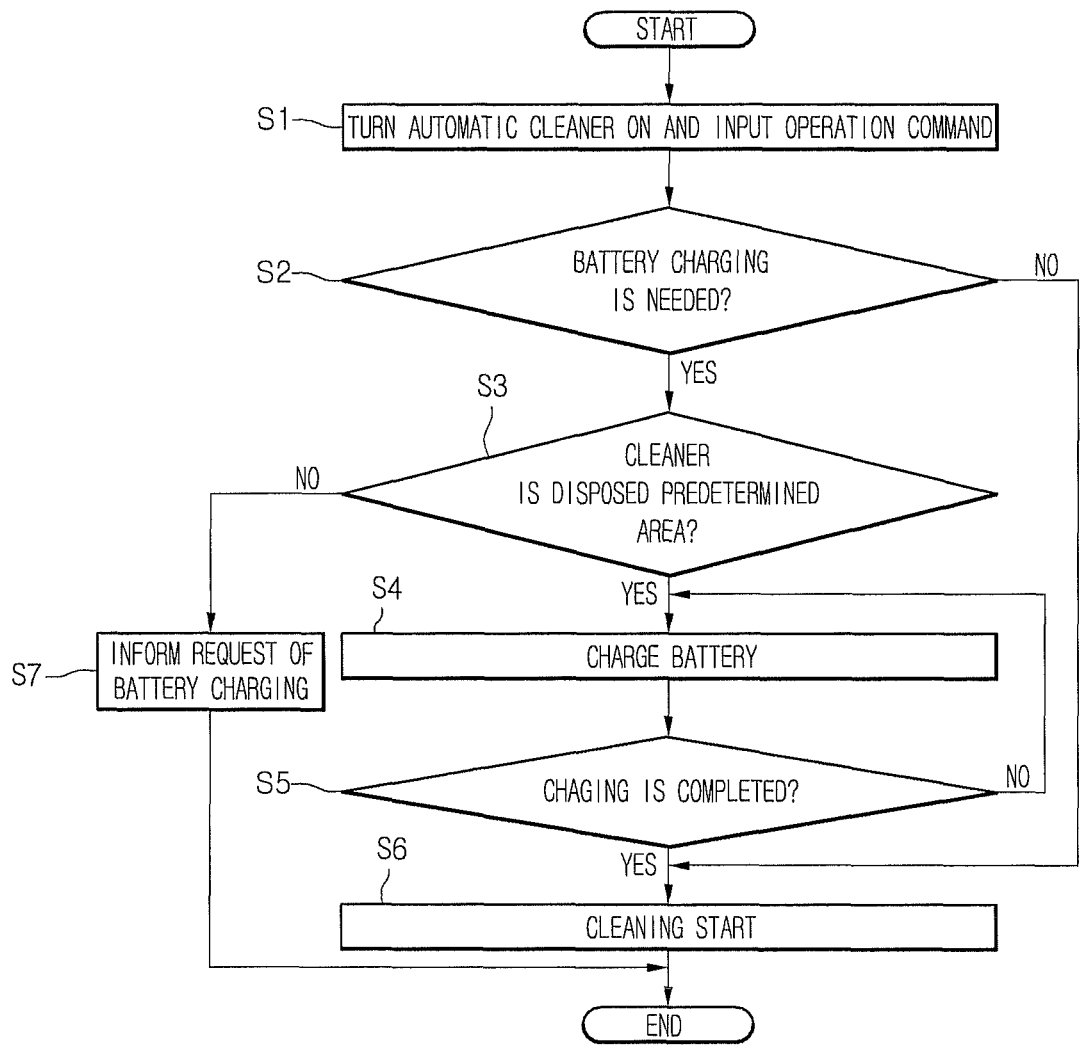
FIG. 5 is a flowchart illustrating a method of charging the battery of the automatic cleaner according to the first embodiment.

FIG. 5 is a flowchart illustrating a method of charging the battery of the automatic cleaner according to the first embodiment.

Referring to FIG. 5, in operation S1, an automatic cleaner 10 and 20 is turned on, and then an operation command is inputted in a state where the automatic cleaner 10 and 20 is attached to a target object.

In operation S2, a control part of each of the moving parts 10 and 20 determines whether charging of a battery is needed. When it is determined that charging of any moving part is needed, the control part 180 of the corresponding moving part determines whether the corresponding moving part is disposed within a predetermined area in operation S3. In detail, the control part 180 of the moving part, of which the charging of the battery 186 is needed, transmits an operation signal in a charger 30. Thus, the charger 30 applies current to a first coil part 342 to generate a magnetic field. Then, the control part 180 determines whether the moving part 180 is disposed on a position affected by the magnetic field. That is, whether the moving part is disposed within the predetermined area denotes a determination of whether the moving part is disposed on the position affected by the magnetic field.

For example, when the charging of the battery of each of the moving part 10 and 20 is needed, it is determined whether the first and second moving parts 10 and 20 are disposed within the predetermined area. When the charging of the battery 186 of one of the first and second moving parts 10 and 20 is needed, it is determined whether the moving part of which the charging of the battery 186 is needed is disposed within the predetermined area.

If the moving part of which the charging of the battery 186 is needed is disposed within the predetermined area, the battery 186 of the corresponding moving part is charged in operation S4.

In operation S6, whether the battery 186 is completely charged is determined. When the charging of the battery 186 is completed, cleaning is performed in operation S6.

On the other hand, when the moving part of which the charging of the battery 186 is needed is not disposed within the predetermined area, an alarm part of each of the moving parts 10 and 20 generates a message for informing request of the charging of the battery 186 in operation S7. That is, the alarm part generates a message for informing that each of the moving parts 10 and 20 is not charged by the charger 30. A user confirming the message may change a position of the charger 30 or locate each of the moving parts 10 and 20 at a position adjacent to the charger 30 to charge the battery 30 first.

Here, one of the first and second moving parts 10 and 20 may be disposed in an outdoor space. Thus, the message may be generated from each of the moving parts 10 and 20 to allow the user to easily confirm the message.

In the result determined in the operation S2, when the charging of the battery 186 of each of the moving parts 10 and 20 is not needed, the cleaning is performed immediately in operation S6.

In the current embodiment, since the battery 186 is disposed in each of the moving part 10 and 20 and used in the cleaning process, when all the batteries are not completely charged, the cleaning does not start.

Although the charging process is described in the current embodiment when the battery is disposed in each of the moving parts, the present disclosure is not limited thereto. For example, when the battery is disposed in one of the moving parts, the above-described charging process may be also equally applied.

In the current embodiment, a plurality of chargers may be disposed in a building. In this case, a message is generated from the alarm part only when all the chargers are not affected by the magnetic field. If at least one charger is affected by the magnetic field, the charging of the battery may be performed.

Figure 6:
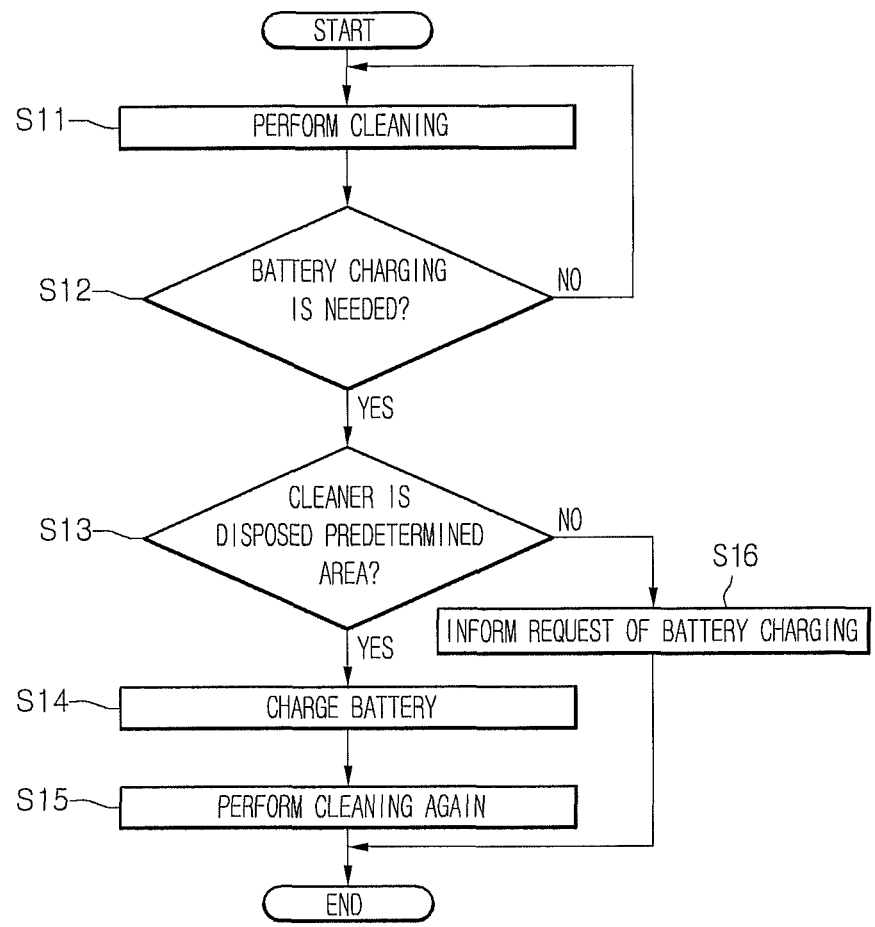
FIG. 6 is a flowchart illustrating a method of charging a battery of an automatic cleaner according to a second embodiment.

FIG. 6 is a flowchart illustrating a method of charging a battery of an automatic cleaner according to a second embodiment.

Referring to FIG. 6, a starting command for an automatic cleaner is inputted to perform cleaning in operation S11. When the automatic cleaner performs the cleaning, a battery of a moving part (the second moving part in FIG. 2) including a solar cell module may be charged. In general, power consumption in the cleaning process may be greater than a charging amount in the battery.

During the cleaning, a control part of each of the moving parts 10 and 20 determines whether charging of the battery is needed in operation S12. When it is determined that charging of a battery of any moving part is needed (when a battery level is below a reference level), a control part 180 of the corresponding moving part determines whether the corresponding moving part is disposed within a predetermined area in operation S13. Since the determination of whether the moving part is disposed within the predetermined area is equal to that described in the first embodiment, detailed description thereof will be omitted.

If each of the moving parts 10 and 20 of which charging of a battery is needed is disposed within the predetermined area, charging of the battery 186 of each of the moving parts 10 and 20 starts in operation S14. In operation S15, whether the charging of the battery 186 is completed is determined, and then, when the charging of the battery 186 is completed, the cleaning is performed again.

On the other hand, each of the moving parts 10 and 20 of which charging of the battery is needed is not disposed within the predetermined area, an alarm part of each of the moving parts and 20 generates a message for informing request of the charging of the battery in operation S16.

Here, each of the moving parts 10 and 20 may be stopped at the present position, stopped after each of the moving parts 10 and 20 returns to an operation start position, or stopped after each of the moving parts 10 and 20 is moved at the lowest position of the target object.

Figure 7:
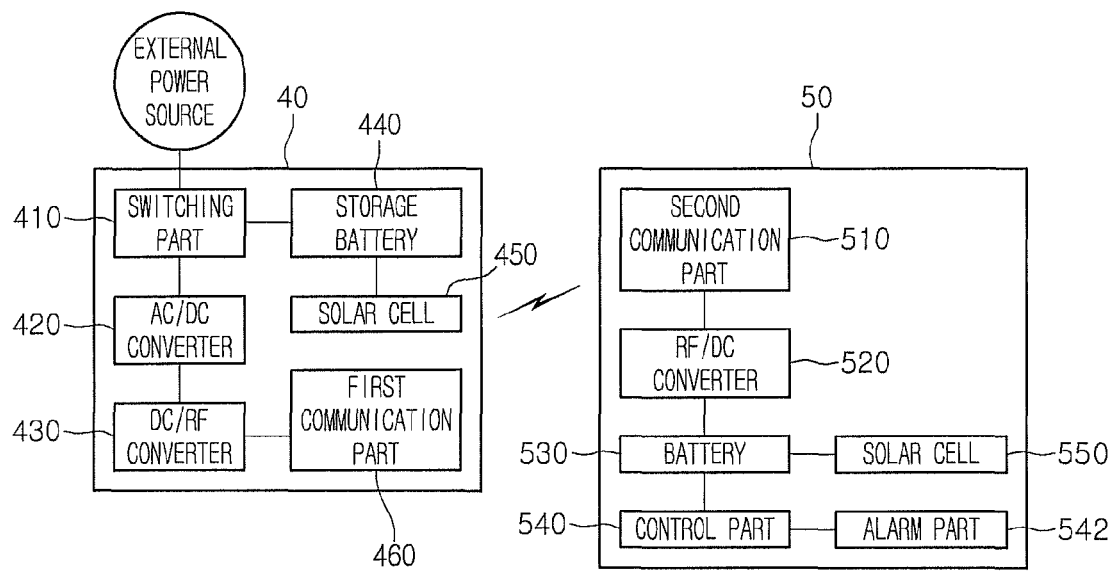
FIG. 7 is a block diagram of a charging system according to a third embodiment.

FIG. 7 is a block diagram of a charging system according to a third embodiment.

The current embodiment is the same as the first embodiment in fundamental configurations of the automatic cleaner except for a charging method and a portion of configurations of the automatic cleaner according to the charging method. Thus, only characterized parts in the current embodiment will be described below.

An automatic cleaner according to the current embodiment includes a first moving part and a second moving part. Here, since configurations for charging the batteries of the moving parts are equal to each other, a configuration for charging the automatic cleaner will be described without classifying the first and second moving parts.

Referring to FIG. 7, a charging system according to the current embodiment includes a charger 40 and an automatic cleaner 50.

The charger 40 includes a solar cell 450, a storage battery 440 for storing electrical energy generated in the solar cell 450, a switching part 410 for selecting one of the storage battery 440 and an external commercial power source, an AC/DC converter 420 for converting a supplied AC power into a DC power, a DC/RF converter 430 for converting the DC power converted by the AC/DC converter 420 into a radio frequency (RF), and a first communication part 460 for receiving the radio frequency (a charging-related signal) converted by the DC/RF converter 430.

The automatic cleaner 50 includes a second communication part 510 for receiving the radio frequency transmitted from the charger 40, a RF/DC converter 520 for converting the radio frequency received into the second communication part 510 into a DC power, a battery 530 charged by the DC power converted by the RF/DC converter 520, a control part 540 connected to the battery 530, a solar cell 550 connected to the battery 530, and an alarm part 542.

In detail, a microwave may be used as the radio frequency transmitted from the first communication part 460. The second communication part 510 receives the radio frequency transmitted from the first communication part 460 in a state where the second communication part 510 is disposed within a predetermined distance range (chargeable range).

The control part 540 is connected to the battery 530 to detect a battery level, thereby determining whether charging of the battery 530 is needed.

Here, although the second communication part 510 and the RF/DC converter 520 are disposed in the automatic cleaner in the current embodiment, the present disclosure is not limited thereto. For example, unlike the above-described structure, a rectenna may be provided. The rectenna is a compound word of a rectifier and an antenna. Since the rectenna is a previously known technique, detailed description thereof will be omitted.

The alarm part 542 informs a message to the outside when the radio frequency is not received from the first communication part 460.

Since the charging method according to the current embodiment is equal to that described with reference to FIGS. 5 and 6, detailed description thereof will be omitted. However, the predetermined area in FIGS. 5 and 6 denotes an area in which the radio frequency can be received.

Figure 8:
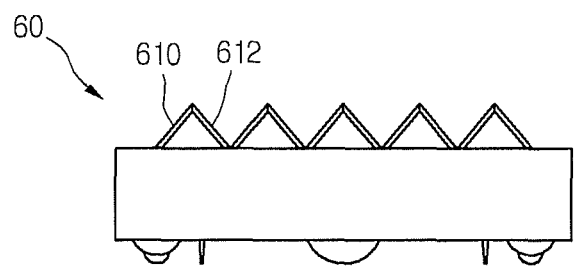
FIG. 8 is a perspective view of a moving part constituting an automatic cleaner according to a fourth embodiment.

FIG. 8 is a perspective view of a moving part constituting an automatic cleaner according to a fourth embodiment.

The current embodiment is the same as the first embodiment except for a shape of a solar cell module. Thus, only characterized parts in the current embodiment will be described below.

Referring to FIG. 8, a solar cell module according to the current embodiment includes a first solar cell 610 and a second solar cell 612 disposed inclined in a direction opposite to that of the first solar cell 610. That is, the solar cell module includes a plurality of solar cells disposed inclined in directions different from each other.

In the current embodiment, top surfaces of the first solar cell 610, the second solar cell 612, and a moving part 60 form a triangular shape when viewed from lateral side.

Also, the first and second solar cells 610 and 612 may be alternately disposed in plurality.

In the current embodiment, an area receiving solar light may be increased to increase a charging amount per unit time.

Figure 9:
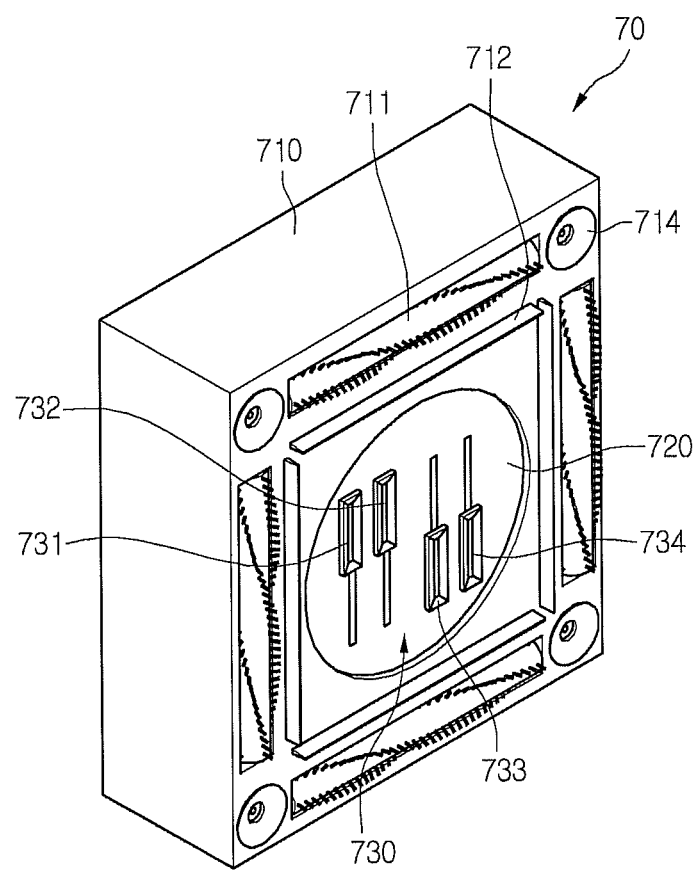
FIG. 9 is a perspective view of an automatic cleaner according to a fifth embodiment.
Figure 10:
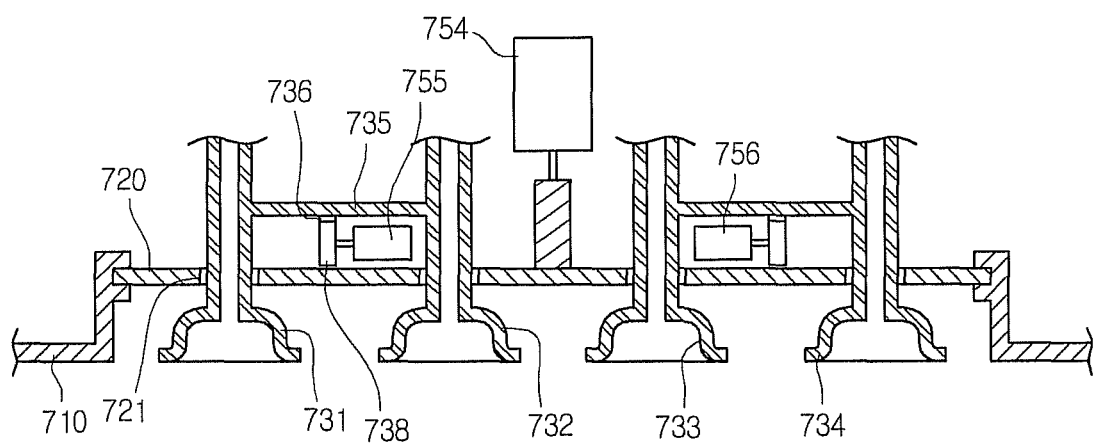
FIG. 10 is a partial sectional view illustrating a second moving part of the automatic cleaner of FIG. 9.
Figure 11:
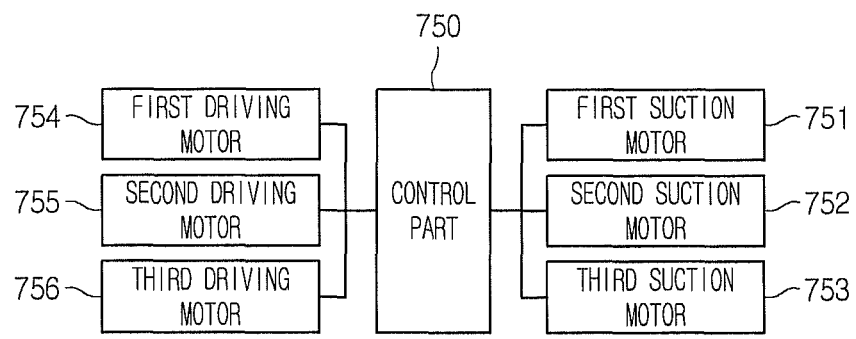
FIG. 11 is a block diagram of an automatic cleaner according to a fifth embodiment.

FIG. 9 is a perspective view of an automatic cleaner according to a fifth embodiment. FIG. 10 is a partial sectional view illustrating a second moving part of the automatic cleaner of FIG. 9. FIG. 11 is a block diagram of an automatic cleaner according to a fifth embodiment.

The current embodiment is the same as one of the first to third embodiments in charging structure and method except for a configuration of an automatic cleaner. Thus, only characterized parts in the current embodiment will be described below.

Referring to FIGS. 9 to 11, an automatic cleaner 70 according to the current embodiment performs cleaning in a state where the automatic cleaner 70 is attached to one surface of a target object.

The automatic cleaner 70 includes a first moving part 710 and a second moving part 720 is relatively movably coupled to the first moving part 710. The first and second moving parts 710 and 720 may be moved together with each other and relatively moved with respect to each other.

The first moving part 710 includes a first cleaning member 711, a second cleaning member 712, and at least one fixed absorption part 714. The first and second cleaning members 711 and 712 are equal to those of the first embodiment in structure, position, and configuration (the second driving part) for rotating the first cleaning member 711, and their detailed descriptions will be omitted. The inlet port according to the first embodiment may be removed or provided in the current embodiment. For example, FIG. 9 illustrate a structure in which the inlet port is removed.

The fixed absorption part 714 may be provided in plurality. Also, the fixed absorption part 714 communicates with a first suction motor 751.

When the first suction motor 751 is operated, a negative pressure may be applied to the fixed absorption part 714 to absorb the target object on the fixed absorption part 714.

The second moving part 720 includes a traveling part (that may be referred to as a moving unit) 730 for moving a cleaner 70 along the target object. The traveling part 730 may be moved just when the cleaner is attached to the target object.

In detail, the traveling part 730 includes a first traveling part and a second traveling part. The first traveling part includes a first absorption part 731 and a second absorption part 732. The first absorption part 731 and the second absorption part 732 communicate with a second suction motor 752.

The second traveling part includes a third absorption part 733 and a fourth absorption part 734. The third absorption part 733 and the fourth absorption part 734 communicate with third suction motor 753. Thus, a negative pressure may be independently applied to the first and second traveling parts.

Each of the absorption parts 731, 732, 733, and 734 and the second moving part 720 may be relatively moved by a slot 721 disposed in the second moving part 720. Alternatively, each of the absorption parts 731, 732, 733, and 734 and the second moving part 720 may be moved together with each other.

The first absorption part 731 and the second absorption part 732 may be connected to each other by a connection part 735. A rack gear 736 is disposed on the connection part 735. A pinion gear 738 coupled to a second driving motor 755 is engaged with the rack gear 736.

Similarly, the third absorption part 733 and the fourth absorption part 734 may be connected to each other by a connection part. Also, the third absorption part 733 and the fourth absorption part 734 are connected to a third driving motor 756 by a rack gear and a pinion gear.

Thus, when the second driving motor is operated in a state where the first and second absorption parts 731 and 732 are absorbed on the target object, the first and second moving parts 710 and 720 except for the first and second absorption parts 731 and 732 are moved. That is, in a state where the first and second absorption parts 731 and 732 are disposed at positions illustrated in FIG. 9, when the second driving motor 755 is operated, the first and second moving parts 710 and 720 are moved upward from the positions with respect to FIG. 9.

To continuously move the automatic cleaner 70 upward, the third and fourth absorption parts 733 and 734 should be moved upward by the third driving motor 756 in the state where the first and second absorption parts 731 and 732 are absorbed on the target object. Also, to move the third and fourth absorption parts 733 and 734 upward, the third suction motor 753 should not be operated.

Thus, the cleaner may be linearly moved by the traveling part 730.

A direction change of the cleaner may be performed by operating the first driving motor 754 in a state where the fixed absorption part 714 is absorbed on the target object. For example, the second driving motor 755 may be fixed to the first moving part 710.

The first driving motor 754 is connected to the second moving part 720. Thus, when the first driving motor 754 is operated, the second moving part 720 may be rotated with respect to the first moving part 710 in a state where the first moving part 710 is fixed to the target object. That is, the second moving part 720 is rotatably connected to the first moving part 710.

Also, when the direction change of the cleaner is completed, the negative pressure applied to the fixed absorption part 714 is removed.

Also, each of the suction motor and the driving motor may be controlled by a control part 750.

In the current embodiment, a battery and a solar cell may be disposed on at least one of the first and second moving parts.

Figure 12:
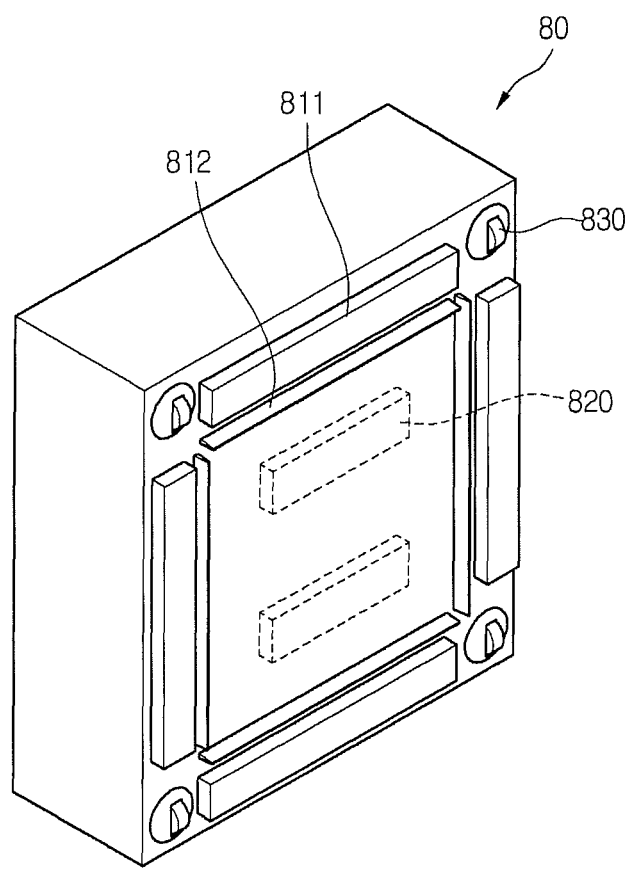
FIG. 12 is a perspective view illustrating a second moving part of an automatic cleaner according to a sixth embodiment.

FIG. 12 is a perspective view illustrating a second moving part of an automatic cleaner according to a sixth embodiment.

A first moving part according to the current embodiment is equal to that of the first embodiment, and a charging structure and method are equal to those of the first to third embodiments except for a configuration of a second moving part. Thus, a characterized part according to the current embodiment will be principally described.

Referring to FIG. 12, a second moving part 80 according to the current embodiment includes a first cleaning member 811, a second cleaning member 812, a magnetic member 820, and a wheel 830.

The first cleaning member 811 may be provided in plurality. Since the first cleaning member is disposed at the same position as that of the first embodiment, detailed description thereof will be omitted. However, the first cleaning member 811 according to the current embodiment has a thin plate shape and is not rotated, unlike the first embodiment. The first cleaning member 811 is formed of a fiber material. Thus, when second moving part is moved, one surface of the target object is polished.

The second cleaning member 812 has the same material and position as that of the first embodiment. The second moving part may be easily moved by the wheel 830.

In the current embodiment, since it is unnecessary to provide a structure for rotating the first cleaning member, the second moving part may be simplified in structure and reduced in weight.

Figure 13:
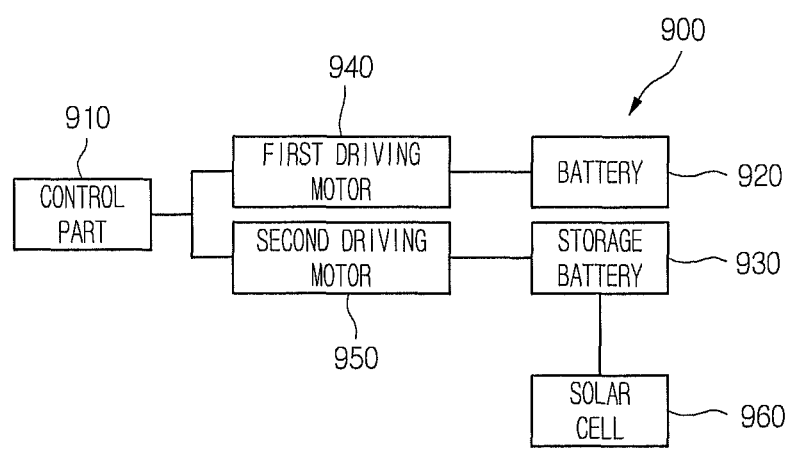
FIG. 13 is a block diagram illustrating a first moving part of an automatic cleaner according to a seventh embodiment.

FIG. 13 is a block diagram illustrating a first movement part of an automatic cleaner according to a seventh embodiment.

The current embodiment is the same as the first embodiment except for power supply sources for first and second driving parts. Thus, only characterized parts in the current embodiment will be described below.

Referring to FIG. 13, an automatic cleaner according to the current embodiment includes a first moving part 900, a control part 910, a battery 920, a solar cell 960, a storage battery 930, a first driving part 940 receiving power from the battery 920, and a second driving part 950 receiving power from the storage battery 930.

The first driving part 940 has the same function as that of the first driving part according to the first embodiment, and the second driving part 950 has the same function as that of the second driving part according to the first embodiment.

According to the current embodiment, the first and second driving parts 940 and 950 receive power from power supply sources different from each other, respectively. The storage battery connected to the second driving part may store electrical energy generated in the solar cell 960. Thus, an available time (available time when charged once) of the battery 920 may be increased. Thus, the number of charging of the battery 920 may be reduced.

Although the second driving part receives power from the storage battery and the first driving part receives power from the battery in the current embodiment, the present disclosure is not limited thereto.

That is, the first driving part may be connected to the storage battery, and the second driving part may be connected to the battery. Also, a suction motor (not shown) may be connected to one of the battery and the storage battery.

In the foregoing embodiments, at least two energy consumption parts consuming electrical energy may receive power from power supply sources different from each other. That is, a first energy consumption part may receive power from the battery, and a second energy consumption part may receive power from the storage battery.

Figure 14:
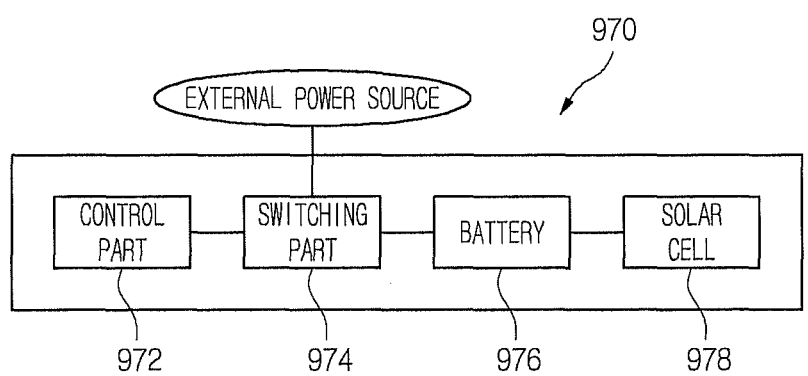
FIG. 14 is a block diagram illustrating a moving part of an automatic cleaner according to an eighth embodiment.

FIG. 14 is a block diagram illustrating a moving part of an automatic cleaner according to an eighth embodiment.

The current embodiment is the same as the first embodiment except that commercial power may be supplied to a first moving part. Thus, only characterized parts in the current embodiment will be described below.

Referring to FIG. 14, a moving part 970 of an automatic cleaner according to the current embodiment includes a control part 972, a solar cell 978, a battery 976 (or storage battery), and a switching part 974 for selecting one of an external commercial power source or the battery 976. Also, the moving part 970 includes a power cord for receiving power from the external commercial power source.

According to the current embodiment, when charged capacitance of the storage battery 976 is above a predetermined level, the moving part 970 does not use power of the storage battery 976. Also, when the charged capacitance of the storage battery of the storage battery 976 is below a predetermined level, the moving part 970 does not use power of the external commercial power source.

The invention claimed is:

1. A charging system comprising:
an automatic cleaner performing cleaning while moving in a state in which the automatic cleaner is attached to a target surface inclined with respect to the ground, the automatic cleaner including at least one battery; and
a charger configured to charge the at least one battery in a state in which the automatic cleaner is physically spaced apart from the charger,
wherein the automatic cleaner includes:
first and second moving parts that move together with each other along the target surface;
a moving unit provided on at least one of the first or second moving parts; and
a cleaning member that cleans the target surface,
wherein the automatic cleaner receives a charging related signal to charge the battery using the signal,
wherein when charging of the battery is needed during the cleaning by the automatic cleaner, the automatic cleaner transmits an operation signal to the charger regardless of a location of the automatic cleaner, the charger generates the charging related signal when the charger receives the operation signal, the automatic cleaner determines whether the automatic cleaner is within a predetermined area in which the charging related signal is received from the charger, and when the automatic cleaner is within the predetermined area, a movement of the automatic cleaner stops and the charging of the battery starts.

2. The charging system according to claim 1, wherein the charging related signal is a magnetic field generated by current flowing into the charger.

3. The charging system according to claim 1, wherein the charger includes a signal generator for transmitting the charging related signal to charge the battery, and the automatic cleaner includes a charging current generator for charging the battery according to the charging related signal.

4. The charging system according to claim 3, wherein the signal generator includes a first coil part generating a magnetic field when a predetermined current flows, and the charging current generator includes a second coil part generating current by the magnetic field, wherein the charger applies current to the first coil part to generate the magnetic field when the charger receives the operation signal from the automatic cleaner.

5. The charging system according to claim 1, wherein the charger includes a converter converting power into a radio frequency and a first communication part receiving a signal converted in the converter, and the automatic cleaner includes a second communication part receiving the radio frequency transmitted from the first communication part and a converter converting the received radio frequency into power.

6. The charging system according to claim 1, wherein, when the automatic cleaner is not within the predetermined area, an alarm part provided in the automatic cleaner generates a message that requests the charging of the battery.

7. The charging system according to claim 1, further including an attachment maintaining unit for maintaining a state in which the first and second moving parts are attached to the target surface.

8. The charging system according to claim 1, wherein the moving unit includes at least one absorption part for maintaining a state in which the first and second moving parts are attached to the target surface.

9. The charging system according to claim 1, wherein the automatic cleaner further includes a solar cell module for charging the battery.

10. The charging system according to claim 9, wherein the solar cell module includes an installation part separably installed on at least one of the first or second moving parts and a solar cell installed on the installation part.

11. The charging system according to claim 9, further including a switching part for selecting one of a power of the battery and an external commercial power.

12. The charging system according to claim 1, wherein the charger includes a solar cell, a storage battery for storing energy generated in the solar cell, and a switching part for selecting one of a power of the storage battery and an external commercial power.

* * * * *